(12) United States Patent
Li

(10) Patent No.: US 7,343,645 B2
(45) Date of Patent: Mar. 18, 2008

(54) ELECTRONIC APPARATUS HAVING DETACHABLE DISPLAY AND MAINFRAME

(75) Inventor: Tsung Hsien Li, Taipei (TW)

(73) Assignee: Asustek Computer Inc., Taipei (TW)

( * ) Notice: Subject to any disclaimer, the term of this patent is extended or adjusted under 35 U.S.C. 154(b) by 205 days.

(21) Appl. No.: 11/052,782

(22) Filed: Feb. 9, 2005

(65) Prior Publication Data

US 2005/0239307 A1    Oct. 27, 2005

(30) Foreign Application Priority Data

Apr. 23, 2004 (TW) .............................. 93111528 A
Jun. 18, 2004 (CN) ........................ 2004 1 0059384

(51) Int. Cl.
*E05D 7/10* (2006.01)

(52) U.S. Cl. ........................... 16/258; 16/262; 361/681

(58) Field of Classification Search .................. 16/258, 16/262, 259–272; 361/680–683; 248/917–923; 348/373, 333.06; 455/575.1, 575.4, 375.8, 455/550.1
See application file for complete search history.

(56) References Cited

U.S. PATENT DOCUMENTS

| | | | | |
|---|---|---|---|---|
| 5,498,165 A * | 3/1996 | Tseng | ........................... | 439/31 |
| 5,507,072 A * | 4/1996 | Youn | ........................... | 16/261 |
| 5,636,102 A * | 6/1997 | Fujino et al. | ............... | 361/681 |
| 6,070,494 A * | 6/2000 | Horng | ......................... | 74/607 |
| 6,272,006 B1 * | 8/2001 | Lee | .............. | 361/681 |
| 6,310,768 B1 * | 10/2001 | Kung et al. | ................. | 361/681 |
| 6,389,643 B1 * | 5/2002 | Lim et al. | ..................... | 16/271 |
| 6,512,670 B1 * | 1/2003 | Boehme et al. | ............. | 361/681 |
| 6,796,576 B2 * | 9/2004 | Aoki et al. | .............. | 280/730.2 |
| 2004/0212955 A1 * | 10/2004 | Hsieh | ......................... | 361/681 |

FOREIGN PATENT DOCUMENTS

| | | | | |
|---|---|---|---|---|
| DE | | 3930648 A1 | * | 5/1990 |
| DE | | 29723987 U1 | * | 9/1999 |
| JP | | 2001166849 A | * | 6/2001 |

* cited by examiner

*Primary Examiner*—Chuck Y. Mah
(74) *Attorney, Agent, or Firm*—Bacon & Thomas, PLLC

(57) ABSTRACT

An electronic apparatus, which has a first casing and a second casing, includes a first connecting unit, a second connecting unit, a covering unit and a linked unit. The first connecting unit is fixed on the first casing, and the second connecting unit is pivoted to the first connecting unit. The covering unit has a barrel portion, which covers the second connecting unit. When the covering unit rotates around the second connecting unit, the second connecting unit rotates relative to the barrel portion. A first end of the linked unit is fixed on the second casing, and a second end thereof is connected to the covering unit. When the covering unit rotates, the linked unit rotates relative to the covering unit. The electronic apparatus further includes a first touching unit connected to the covering unit for pulling the covering unit to a first location separating from the second connecting unit.

13 Claims, 10 Drawing Sheets

ELECTRONIC APPARATUS HAVING DETACHABLE DISPLAY AND MAINFRAME

BACKGROUND OF THE INVENTION

1. Field of Invention

The invention relates to an electronic apparatus and, in particular, to an electric apparatus having detachable display and mainframe.

2. Related Art

As the electronic technology improves, people rely more and more on electronic apparatuses. Take notebook computers as an example. The portability makes it very convenient, so that the demand for notebook computers is increased in a great amount during these years.

As shown in FIG. 1, a conventional notebook computer 1 is consisted of a mainframe 11 and a display 12, which are not easily detached. To separate the mainframe 11 from the display 12, the first step is to disassemble the top plate of the mainframe 11, and then unfasten the screws with a screwdriver, so as to reveal the signal flat cables and electric flat cables. Afterward, the flat cables that connect with the display 12 are detached. The last step is to unfasten the screws that connect the mainframe 11 with the display 12 and separate the mainframe 11 and the display 12.

Although the mainframe 11 and the display 12 of the notebook computer 1 are detachable, it takes a lot of time to disassemble and it is not easy to operate.

Under such circumstances, it is an important subjective to provide an electronic apparatus, wherein the display and the mainframe can be easily detached.

SUMMARY OF THE INVENTION

In view of the above, the present invention is to provide an electronic apparatus having a detachable display and a mainframe.

To achieve the above, an electronic apparatus of the invention, which has a first casing and a second casing, includes a first connecting unit, a second connecting unit, a covering unit and a linked unit.

The first connecting unit is fixed on the first casing, and the second connecting unit is pivoted to the first connecting unit. The covering unit has a barrel portion, which covers the second connecting unit. When the covering unit rotates around the second connecting unit, the second connecting unit rotates relative to the barrel portion. A first end of the linked unit is fixed on the second casing, and a second end thereof is connected to the covering unit. When the covering unit rotates, the linked unit rotates relative to the covering unit.

The covering unit further includes a first trench. The second end of the linked unit is inserted into the first trench, and the linked unit rotates along with the covering unit. The electronic apparatus further includes a first touching unit connected to the covering unit. When the first touching unit is moved with an external force toward a first direction, the first touching unit pulls the covering unit toward the first direction, so that the barrel portion is located at a first position and separates from the second connecting unit.

The second end of the linked unit is fixed on the covering unit, and the linked unit rotates relative to the covering unit. An electronic apparatus further comprises at least a first screw, which penetrates through the second casing and is fasten into a first screw hole on the covering unit for fixing the covering unit on the second casing.

In summary, the electronic apparatus of the present invention comprises a first connecting unit, a second connecting unit, a covering unit and a linked unit that is inserted into the first trench. The electronic apparatus further comprises a first touching unit connected to the covering unit. Also, the linked unit is fixed on the covering unit, and the electronic apparatus further comprises a first screw, which fixes the covering unit on the second casing. As a result, the first casing and the second casing of the electronic apparatus of the present invention are easily detached.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements. Hereinafter, a notebook computer is taken as an example for the following descriptions.

Figure 1:
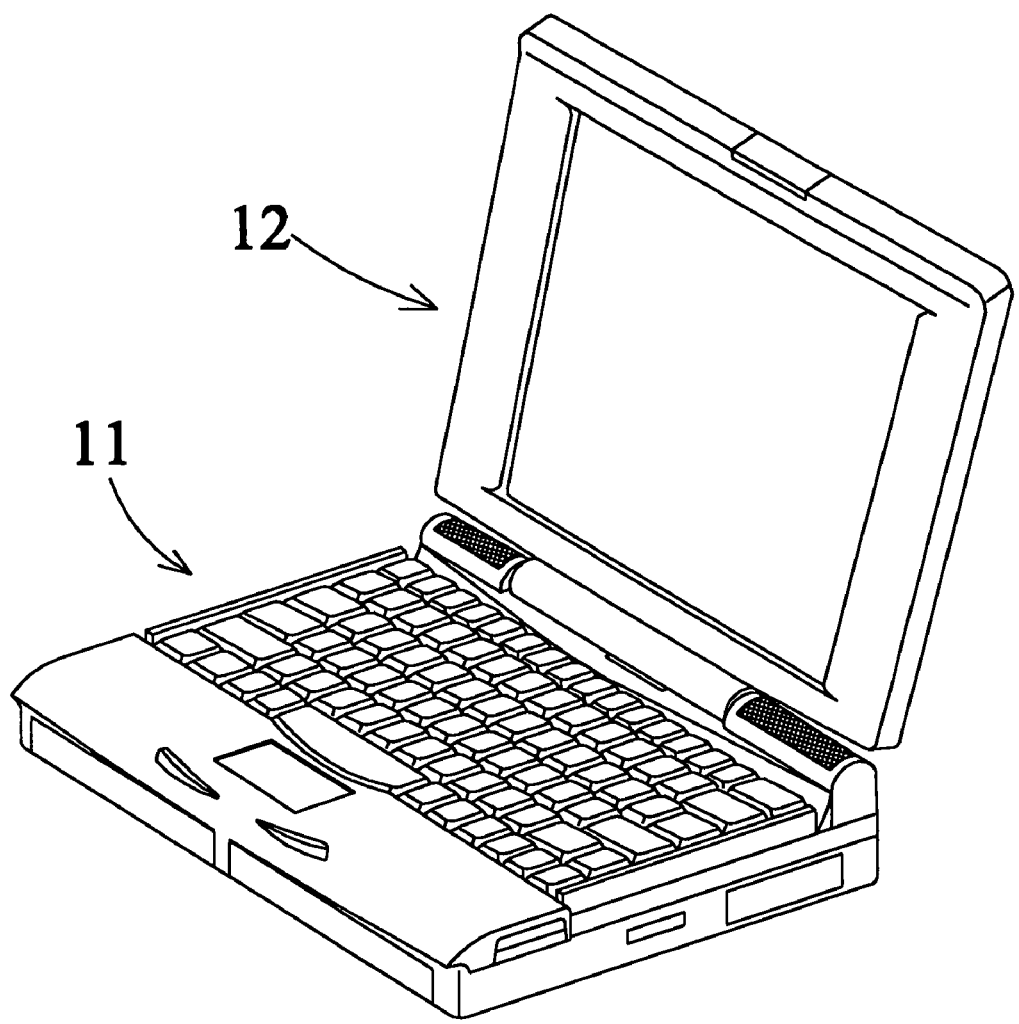
FIG. 1 is a diagram showing a conventional electronic apparatus.
Figure 2:
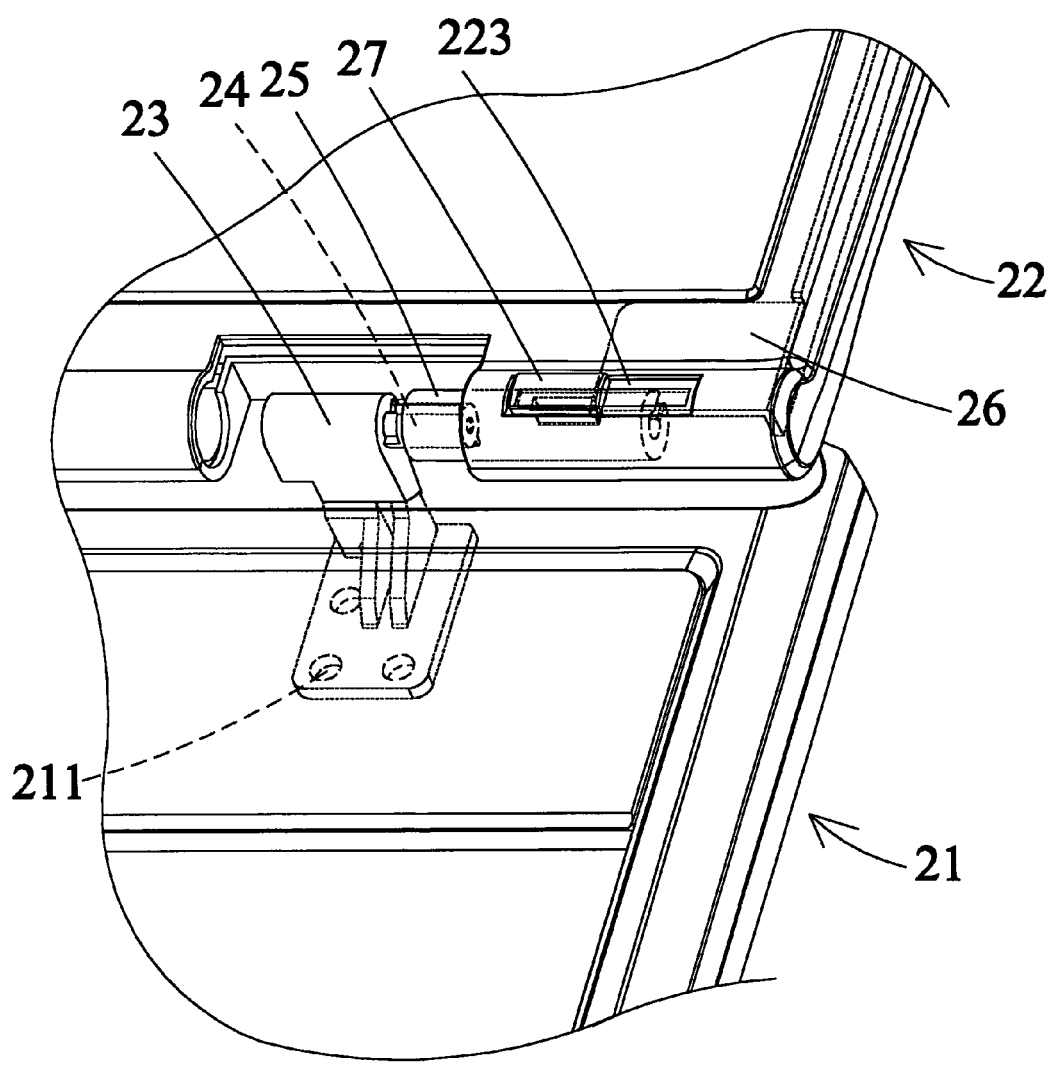
FIG. 2 is a partial enlarged diagram showing an electronic apparatus according to a preferred embodiment of the present invention.
Figure 3:
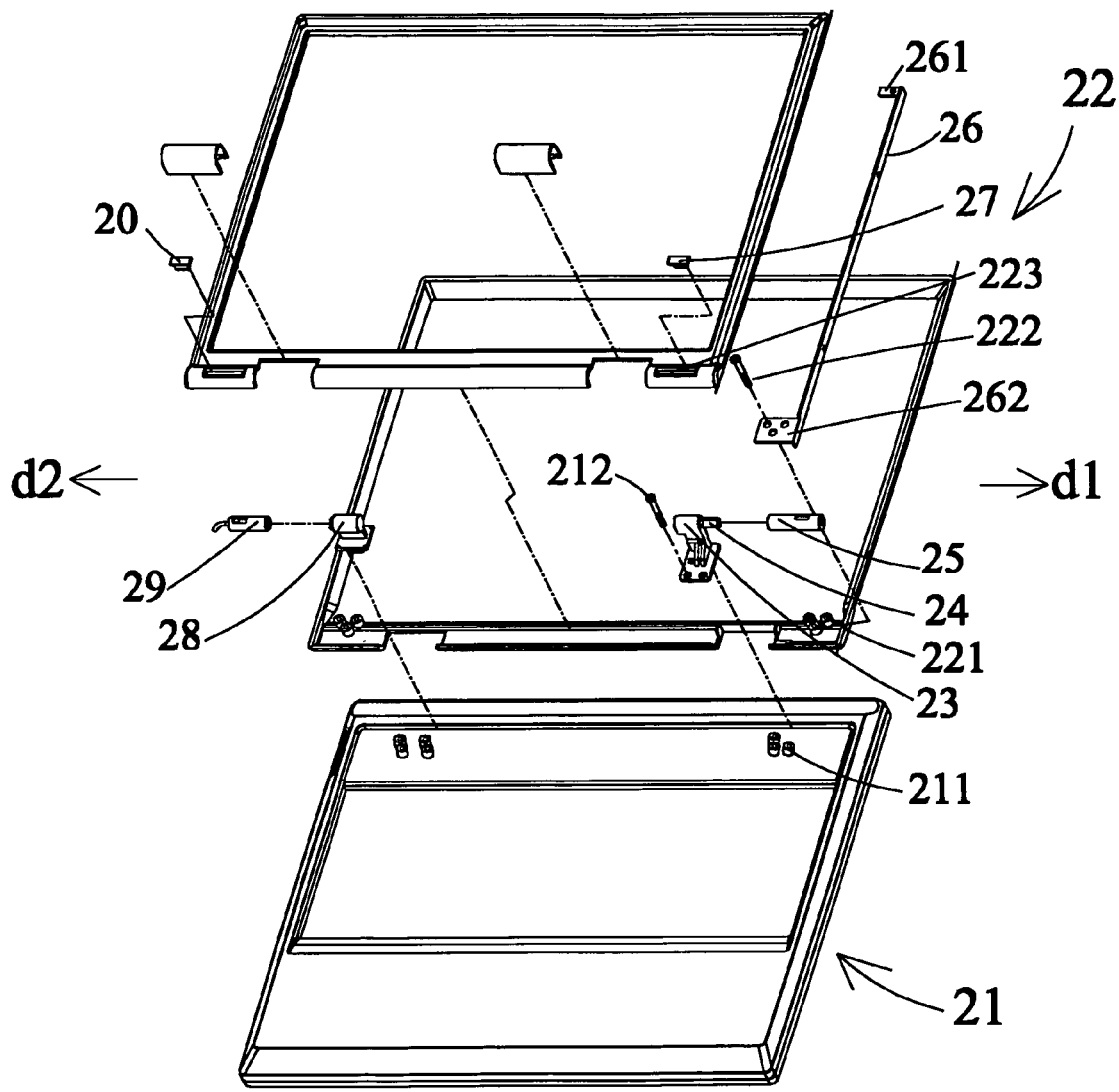
FIG. 3 is a disassembled diagram showing the electronic apparatus according to the preferred embodiment of the present invention.

As shown in FIGS. 2 and 3, an electronic apparatus 2 according to a preferred embodiment of the present invention has a first casing 21 and a second casing 22. The electronic apparatus 2 includes a first connecting unit 23, a second connecting unit 24, a covering unit 25 and a linked unit 26. The first connecting unit 23 is fixed on the first casing 21, and the second connecting unit 24 is pivoted to the first connecting unit 23.

Figure 4A:
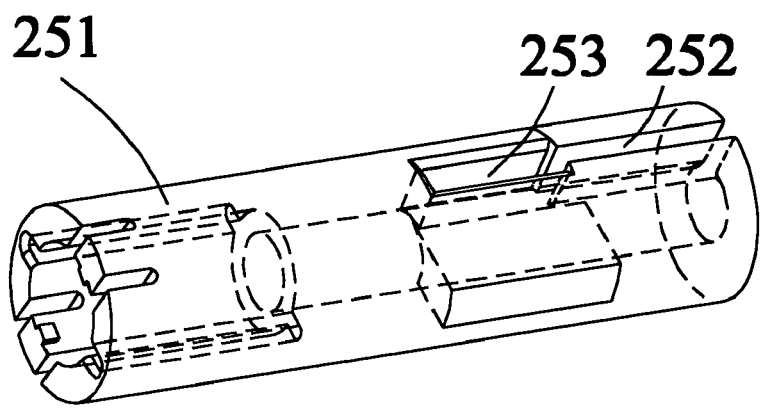
FIG. 4A is a diagram showing a covering unit according to the preferred embodiment of the present invention.

As shown in FIGS. 3 and 4A, the covering unit 25 has a barrel portion 251 and a first trench 252. The barrel portion 251 covers the second connecting unit 24, and the first trench is located on a surface of the covering unit 25. When the covering unit 25 rotates around the second connecting unit 24, the second connecting unit 24 rotates relative to the barrel portion 251.

A first end 261 of the linked unit 26 is fixed on the second casing 22, and a second end 262, which rotates relative to the covering unit 25, is connected to the covering unit 25 and inserted into the first trench 252. When the covering unit 25 rotates, the linked unit 26 rotates relative to the covering unit 25.

Figure 4B:
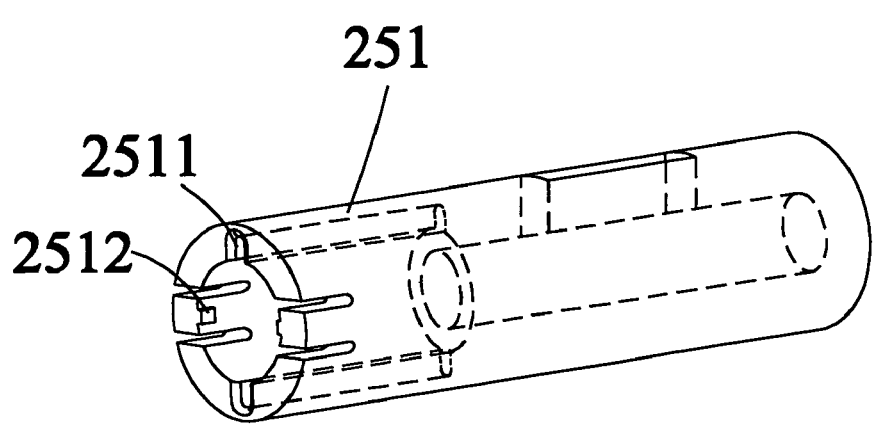
FIG. 4B is a diagram showing another covering unit according to the preferred embodiment of the present invention.
Figure 5:
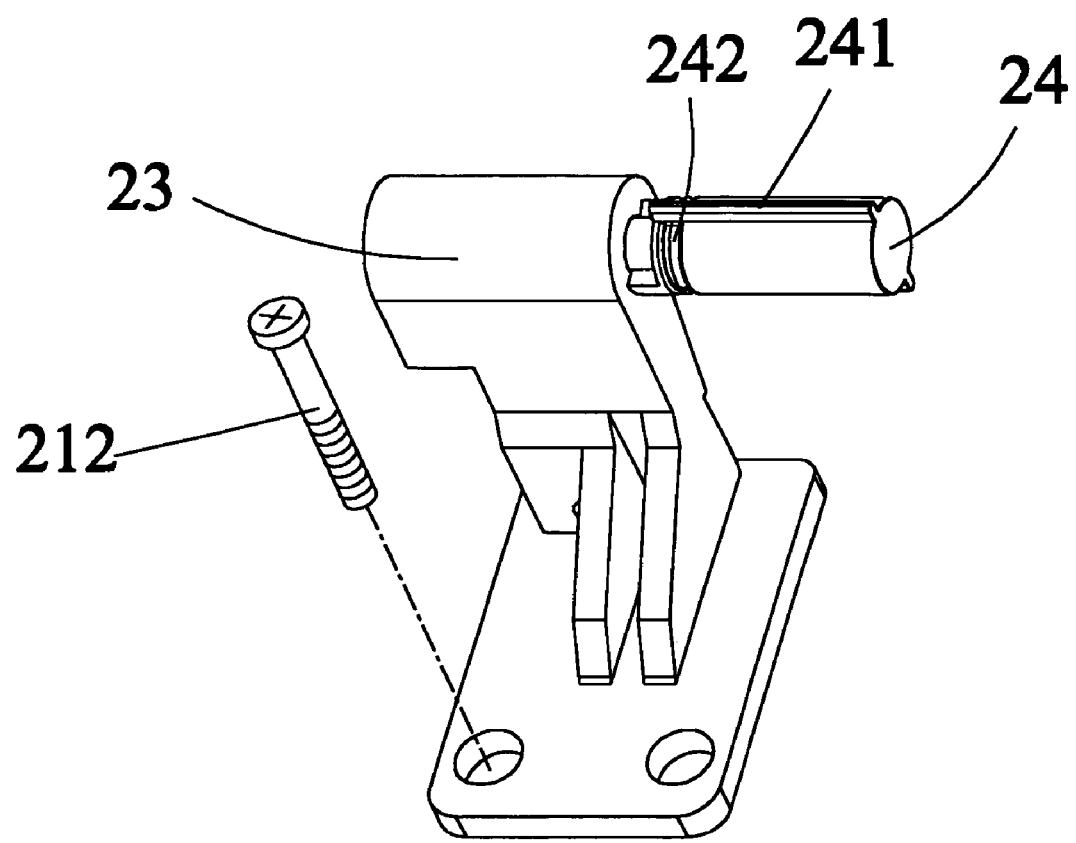
FIG. 5 is a diagram showing a first connecting unit and a second connecting unit according to the preferred embodiment of the present invention.

As shown in FIGS. 4B and 5, an outer surface of the second connecting unit 24 comprises at least a first joining portion 241; a inner surface of the barrel portion 251 comprises a second joining portion 2511, which is inserted into the first barrel portion 241 in a way that allows the barrel portion 251 rotates relative to the second connecting unit 24. The first joining portion 241 and the second joining portion 251 may be a protruding portion or a concave portion. In this embodiment, the first joining portion 241 is a first protruding portion, and the second joining portion 251 is a concave portion.

The second connecting unit 24 further comprises a second trench 242 deposed around the same; the barrel portion 251 further comprises at least a second protruding portion 2512, which is inserted into the second trench 242 in a way that the covering unit 25 is connected to the second connecting unit 24.

With reference to FIGS. 2, 3 and 5, the second casing 22 further comprises at least a second screw hole 221; at least a second screw 222 penetrates through the linked unit for fixing the linked unit on the second casing. The first casing further comprises at least a third screw hole 211; at least a third screw 212 penetrates through the first connecting unit 23 for fixing the first connecting unit 23 on the first casing 21.

Figure 6A:
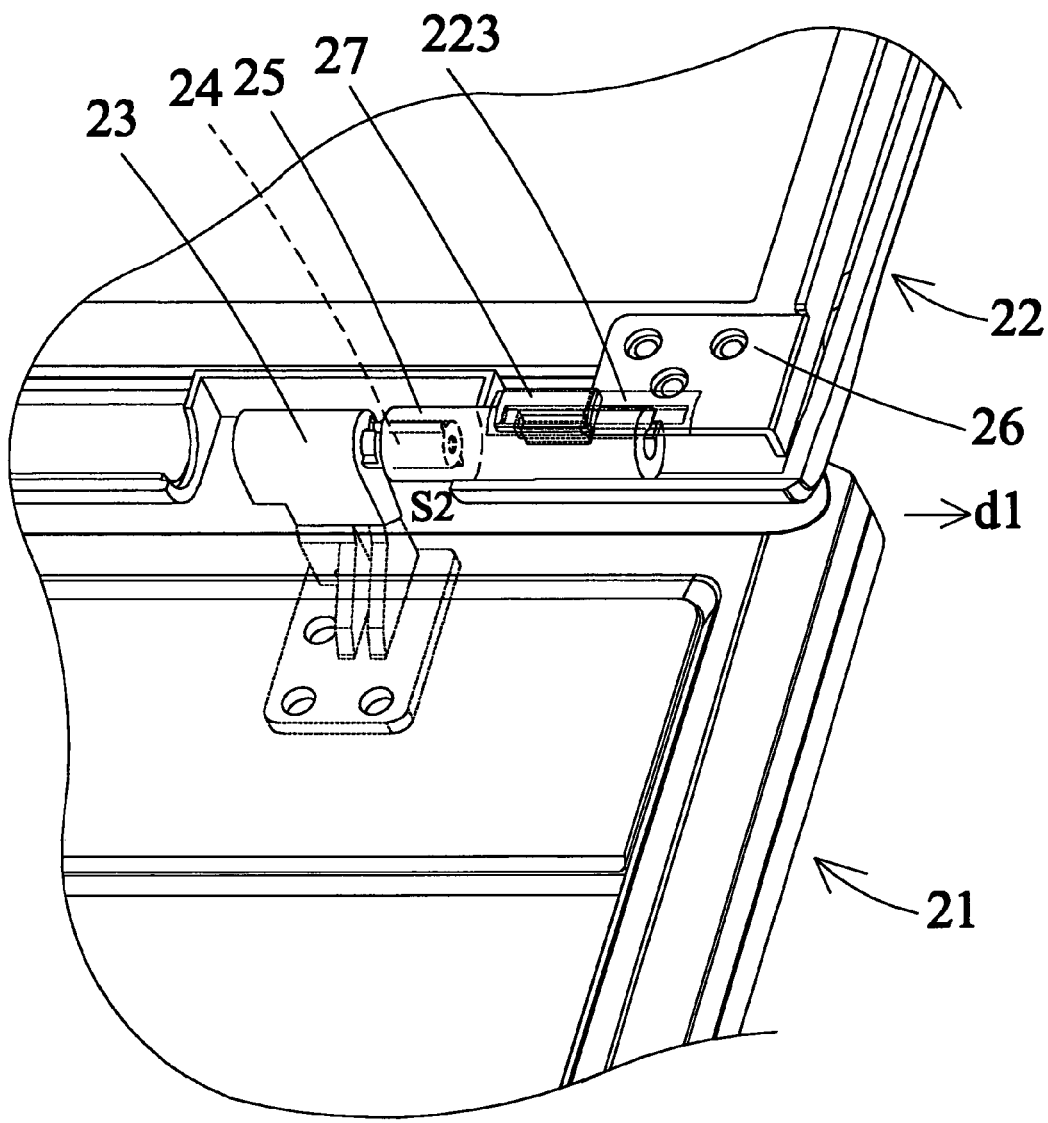
FIGS. 6A to 6B are a set of action diagrams showing a first touching unit according to the preferred embodiment of the present invention.
Figure 6B:
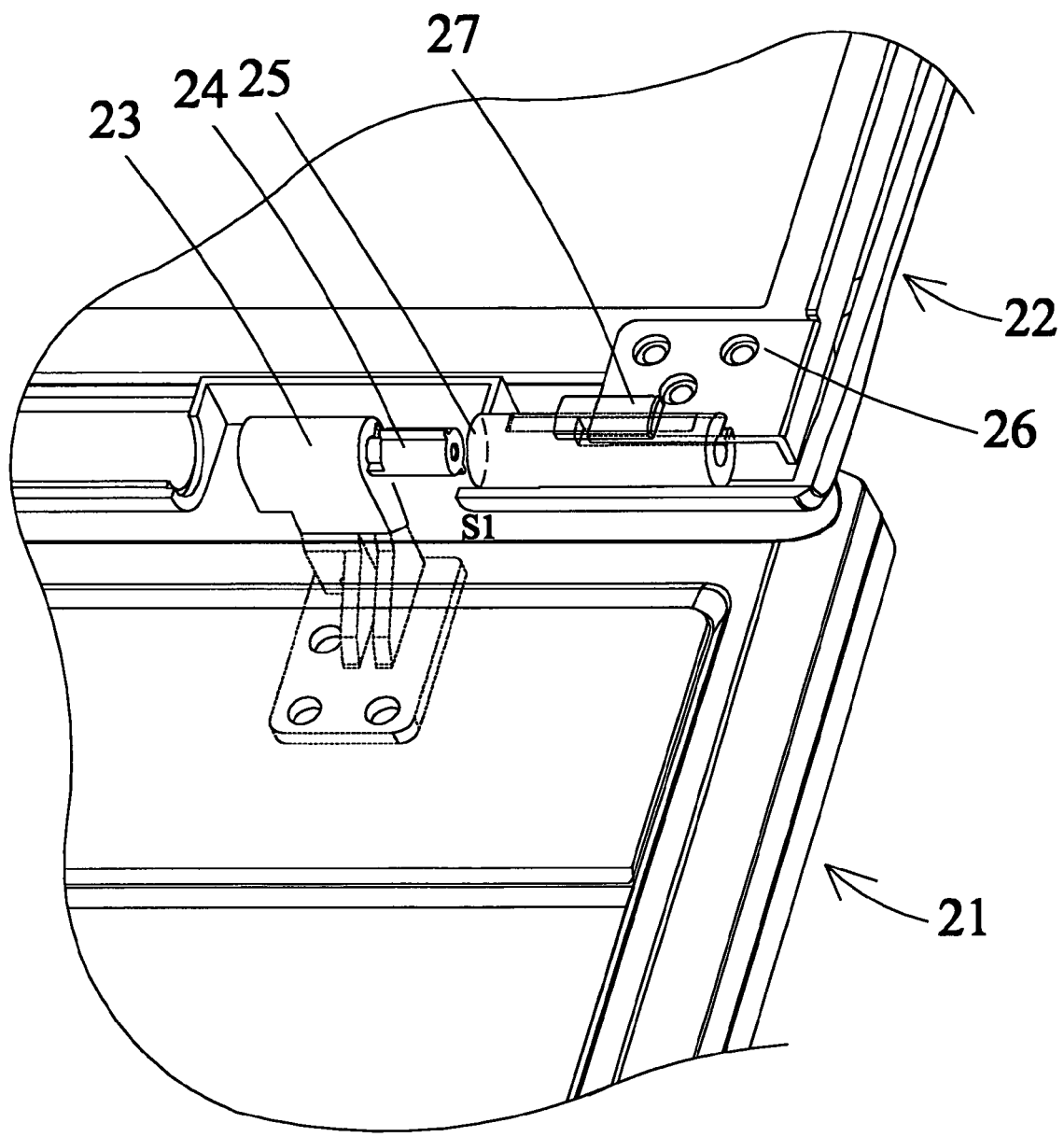

With reference to FIGS. 2, 6A and 6B, the electronic apparatus 2 further comprises a first touching unit 27. The first touching unit 27 is connected to the covering unit 25 through an opening 223 of the second casing 22. When the first touching unit 27 is moved with an external force toward a first direction d1, the first touching unit 27 pulls the covering unit 25 toward the first direction d1, as shown in FIG. 6B, so that the covering unit 25 is located at a first position S1 and separates from the second connecting unit 24. The first touching unit 27 allows the covering unit 25 to slide on the second casing 22 and move between the first position S1 (as shown in FIG. 6B) and the second position S2 (as shown in FIG. 6A). When the covering unit 25 is located at the second position S2, the second connecting unit 24 is connected to the barrel portion 251. For easy understanding, a part of the second casing 22 is removed in FIGS. 6A and 6B, so as to reveal some units deposed in the second casing, and clearly show the arrangement among those units.

As shown in FIG. 4A, the covering unit 25 further comprises an extended trench 253. The extended trench 253 is connected to the first trench 252, and when the covering unit 25 is located at the first position S1 (as shown in FIG. 6B), at least one part of the linked unit 26 is located at the extended trench 253.

Figure 7:
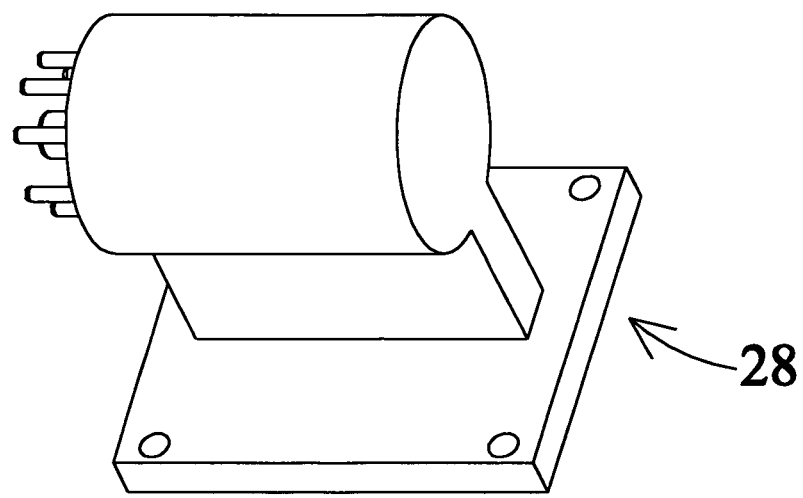
FIG. 7 is a diagram showing a first electric connecting port according to the preferred embodiment of the present invention.
Figure 8:
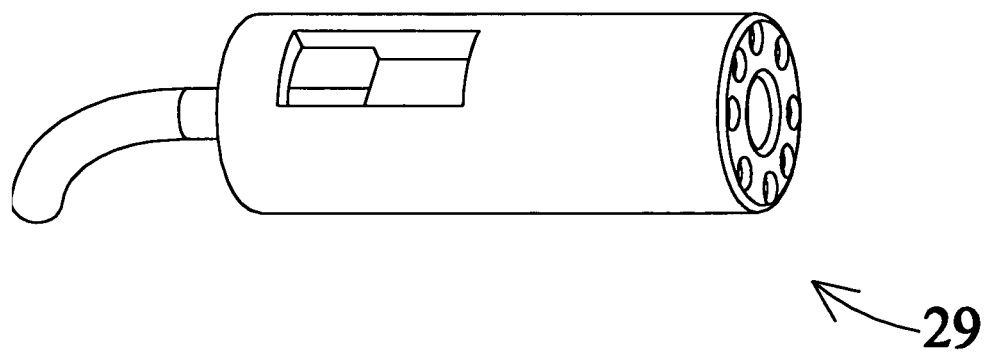
FIG. 8 is a diagram showing a second electric connecting port according to the preferred embodiment of the present invention.

With reference to FIGS. 3, 7 and 8, the electronic apparatus 2 further comprises a electric connecting port 28 deposed on the first casing 21, and a second electric connecting port 29 deposed on the second casing 22 opposed to the first electric connecting port 28, whereby the first casing 21 and the second casing 22 is connected with electricity. The electronic apparatus 2 further comprises a second touching unit 20, which is connected to the second electric connecting port 29; when the second touching unit 20 is moved with an external force toward a second direction d2, the second touching unit 20 pulls the second electric connecting port 29 toward the second direction d2, so that the second electric connecting port 29 is separated from the first electric connecting unit 28.

As mentioned above, since the preferred embodiment of the electronic apparatus 2 of the present invention includes a first connecting unit 23, a second connecting unit 24, a covering unit 25, a linked unit 26 and a touching unit 27, when the first touching unit 27 is moved with an external force toward a first direction d1, the first touching unit 27 pulls the covering unit 25 toward the first direction d1, so that the barrel portion 251 is located at a first position S1 and separates from the second connecting unit 24. The second connecting unit 24 is connected to barrel 251 when the touching unit 27 is located at the second position S2. Further, when the barrel portion 251 is located at the first position S1, users can move the second touching unit 20 toward the second direction d2, which will then pull the second electric connecting port 29 toward the second direction d2, so that the second electric connecting port 29 is separated from the first electric connecting unit 28. As a result, the preferred embodiment of the electronic apparatus of the present invention has a first casing 21 and a second casing 22 that are easily detached.

An electronic apparatus according to another embodiment of the present invention will be described hereinafter. To make the description to be easily understood, the references relating to the same elements of this embodiment and the previous embodiment are the same.

Figure 9:
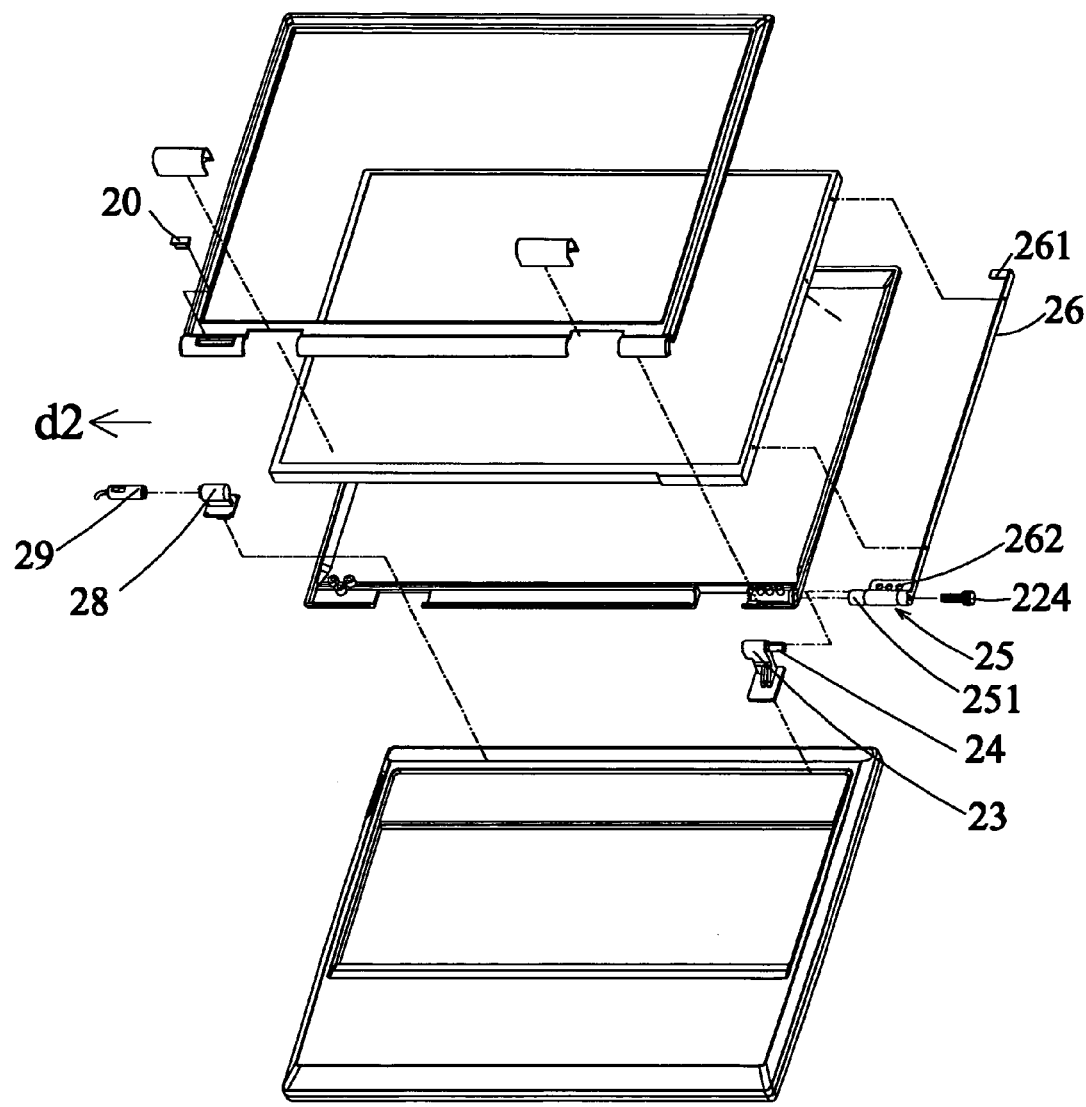
FIG. 9 is a disassembled diagram showing an electronic apparatus according to another preferred embodiment of the present invention.
Figure 10:
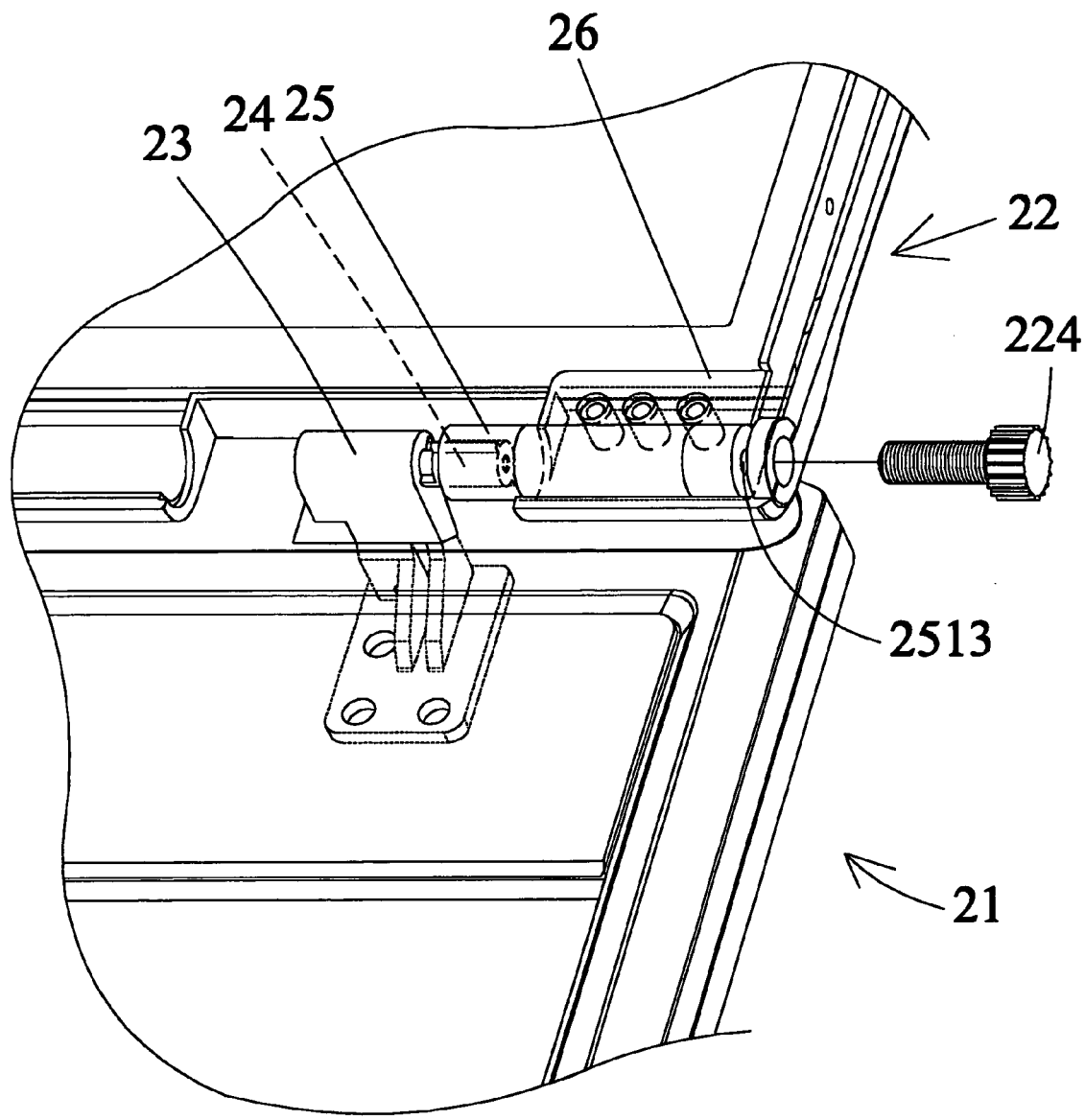
FIG. 10 is a partial enlarged diagram showing the electronic apparatus according to another preferred embodiment of the present invention.

As shown in FIGS. 9 and 10, another preferred embodiment of the electronic apparatus of the present invention has a first casing 21 and a second casing 22, and includes a first connecting unit 23, a second connecting unit 24, a covering unit 25 and a linked unit 26. The first connecting unit 23 is fixed on the first casing 21, and the second connecting unit 24 is pivoted to the first connecting unit 23. The covering unit has a barrel portion 251 that covers the second connecting unit 24. When the covering unit 25 rotates around the second connecting unit 24, the second connecting unit 24 rotates relative to the barrel portion 251. A first end 261 of the linked unit 26 is fixed on the second casing 22, and a second end 262 is connected to the covering unit 25. When the covering unit 25 rotates, the linked unit 26 rotates relative to the covering unit 25. For easy understanding, a part of the second casing 22 is removed in FIG. 10, so as to reveal the units deposed in the second casing, and clearly show the arrangement among those units.

The electronic apparatus 2 further comprises a first electric connecting port 28 and a second electric connecting port 29. The first electric connecting port 28 is deposed on the first casing 21, and the electric connecting port 29 is deposed on the second casing 22 opposed to the first electric connecting port 28, whereby the first casing 21 and the second casing 22 is connected with electricity.

The electronic apparatus 2 may further comprise a second touching unit 20 connected to the second electric connecting port 29.

Since the structure, the way of arrangement and the function of a first connecting unit 23, a second connecting unit 24, a covering unit 25, the first electric connecting port 28, the second electric connecting port 29 and the second touching unit 20 of the preferred embodiment of the electronic apparatus 2 of the present invention are the same with those of the aforementioned electronic apparatus 2, further details will not be given again here. However, in this embodiment, the second end 262 of the linked unit 26 is fixed on the covering unit 25. When the covering unit rotates, the linked unit 26 rotates relative to the covering unit 25. In addition, the preferred embodiment of the electronic apparatus 2 further comprises at least a first screw 224, which penetrate the second casing 22 and is fastened into a first screw hole 2513 of the covering unit 25 for fixing the covering unit 25 on the second casing 22.

As mentioned above, the electronic apparatus comprises a connecting unit 24, a covering unit 25, a linked unit 26 and a first screw 224, and users can separate the second connecting unit 24 and the covering unit 25 by unfastening the first screw 224. In the meantime, users can pull the second touching unit 20 toward the second direction d2, which will then pull the second electric connecting port 29 toward the second direction d2, so that the second electric connecting port 29 is separated from the first electric connecting unit 28. Therefore, the preferred embodiment of the electronic apparatus of the present invention has a first casing and a second casing that are easily detached.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electronic apparatus having a first casing and a second casing, comprising:
   a first connecting unit fixed on the first casing;
   a second connecting unit pivoted to the first connecting unit;
   a covering unit, which has a barrel portion and covers the second connecting unit, wherein when the covering unit rotates around the second connecting unit, the second connecting unit rotates with the barrel portion,
   a linked unit, which has a first end fixed on the second casing, and a second end connected to the covering unit, wherein when the covering unit rotates, the linked unit rotates with the covering unit, wherein the covering unit further comprises a first trench; and the second end of the linked unit is inserted into the first trench; and
   a first touching unit connected to the covering unit, wherein when the first touching unit is moved with an external force toward a first direction, the first touching unit pulls the covering unit toward the first direction, so that the covering unit is located at a first position and separates from the second connecting unit.

2. The electronic apparatus according to claim 1, wherein the first trench is located at a surface of the covering unit, an extended trench is connected to the first trench, and when the covering unit is located at the first position, at least one part of the linked unit is located at the extended trench.

3. The electronic apparatus according to claim 1, wherein a part of the first touching unit penetrates through an opening of the second casing and is connected to the covering unit, the covering unit is capable of sliding on the second casing and moving between the first position and a second position, and when the covering unit is located at the second position, the second connecting unit is connected to the covering unit.

4. The electronic apparatus according to claim 1, wherein the second end of the linked unit is fixed to the covering unit.

5. The electronic apparatus according to claim 4, wherein the linked unit and the covering unit are integrally formed.

6. The electronic apparatus according to claim 4, further comprising at least a first screw, wherein the first screw penetrates through the second casing and is fastened into a first screw hole on the covering unit for fixing the covering unit on the second casing.

7. The electronic apparatus according to claim 1, wherein an outer surface of the second connecting unit comprises at least a first joining portion, and an inner surface of the barrel portion comprises a second joining portion inserted into the first barrel portion such that the covering unit rotates relative to the second connecting unit.

8. The electronic apparatus according to claim 7, wherein the first joining portion is a first protruding portion, and the second joining portion is a concave portion.

9. The electronic apparatus according to claim 1, wherein the second connecting unit comprises a second trench disposed around the second connecting unit, the barrel portion comprises at least a protruding portion inserted into the second trench, whereby the covering unit is connected to the second connecting unit.

10. The electronic apparatus according to claim 1, further comprising a first electric connecting port disposed on the first casing, and a second electric connecting port disposed on the second casing opposite to the first electric connecting port, whereby the first casing and the second casing are electrically connected.

11. The electronic apparatus according to claim 10, further comprising a second touching unit, wherein the second touching unit is connected to the second electric connecting port, and when the second touching unit is moved with an external force toward a second direction, the second touching unit pulls the second electric connecting port toward the second direction, so that the second electric connecting port is separated from the first electric connecting port.

12. The electronic apparatus according to claim 1, wherein the second casing further comprises at least a screw hole, and at least a screw penetrates through the linked unit for fixing the linked unit on the second casing via the screw hole of the second casing.

13. The electronic apparatus according to claim 1, wherein the first casing further comprises at least a screw hole, and a screw penetrates through the first connecting unit for fixing the first connecting unit on the first casing via the screw hole of the first casing.

* * * * *